United States Patent [19]
Tsukagoshi

[11] Patent Number: 5,748,256
[45] Date of Patent: May 5, 1998

[54] SUBTITLE DATA ENCODING/DECODING METHOD AND APPARATUS AND RECORDING MEDIUM FOR THE SAME

[75] Inventor: Ikuo Tsukagoshi, Tokyo, Japan

[73] Assignee: Sony Corporation, Tokyo, Japan

[21] Appl. No.: 619,001

[22] Filed: Mar. 21, 1996

[30] Foreign Application Priority Data

Mar. 23, 1995 [JP] Japan .................................. 7-088607

[51] Int. Cl.$^6$ .............................. H04N 9/74; H04N 5/278
[52] U.S. Cl. ........................ 348/589; 348/600; 348/599; 348/569
[58] Field of Search .................................. 348/468, 473, 348/563, 564, 569, 589, 600, 599; H04N 5/278, 9/74

[56] References Cited

U.S. PATENT DOCUMENTS 5,065,231  11/1991  Greaves .................................. 348/599

*Primary Examiner*—Sherrie Hsia
*Attorney, Agent, or Firm*—William S. Frommer; Alvin Sinderbrand

[57] ABSTRACT

The subtitle data encoding apparatus according to the present invention is used in a video image transmission system. The apparatus creates loading blocks from relative position information by sampling an input bit stream at a frame interval. The loading block corresponds to a pixel data block and contains changeover position information which updates a change position, delays the update operation and sets the length of the delay. The address used to access a color lookup table for displaying subtitle data is changeable at the change position to access different display data stored therein. The pixel data block is encoded from subtitle data and the loading blocks and pixel data blocks are combined for transmission. The changeover position information can also be used to progress a color-wipe operation.

30 Claims, 15 Drawing Sheets

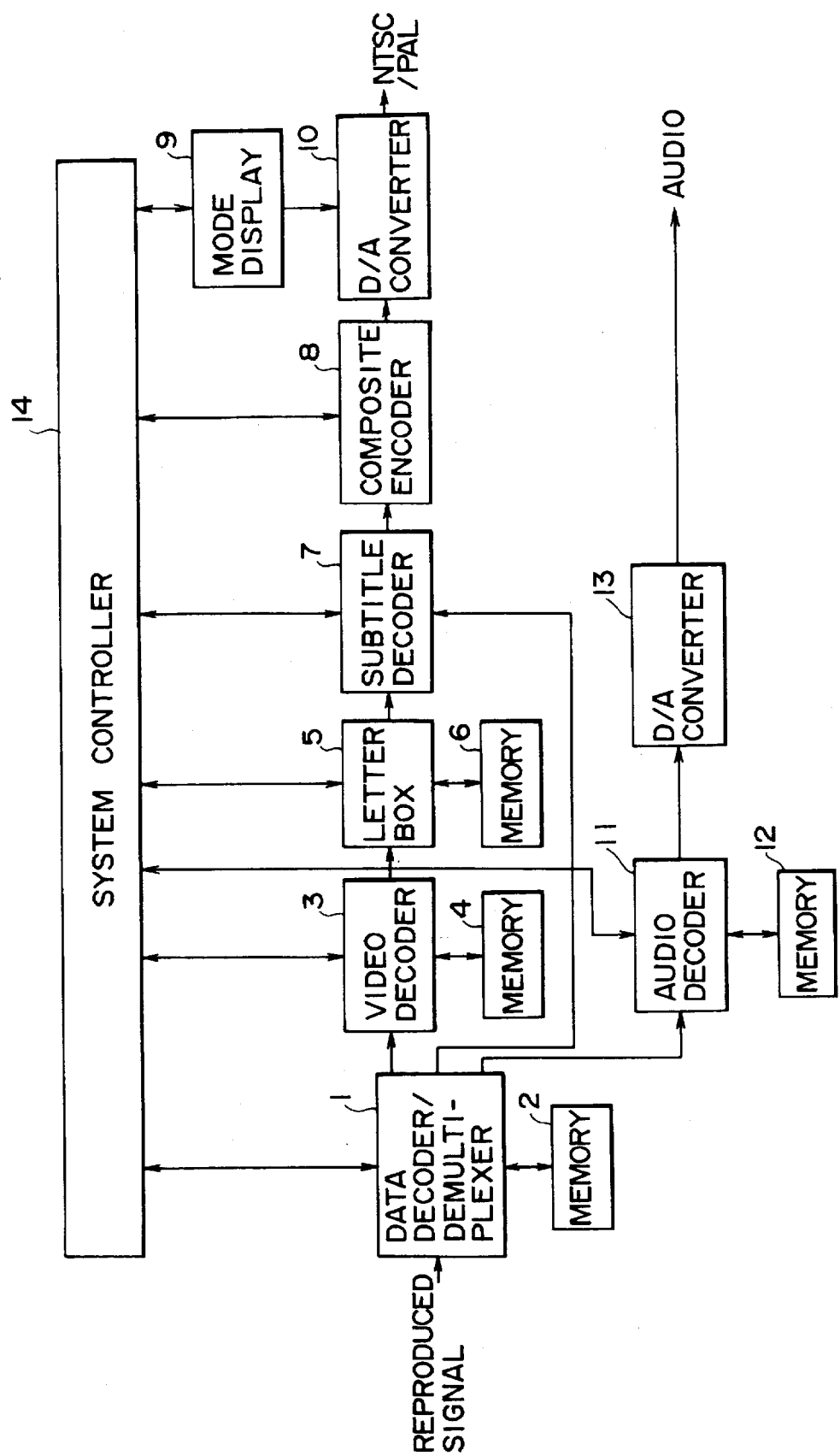

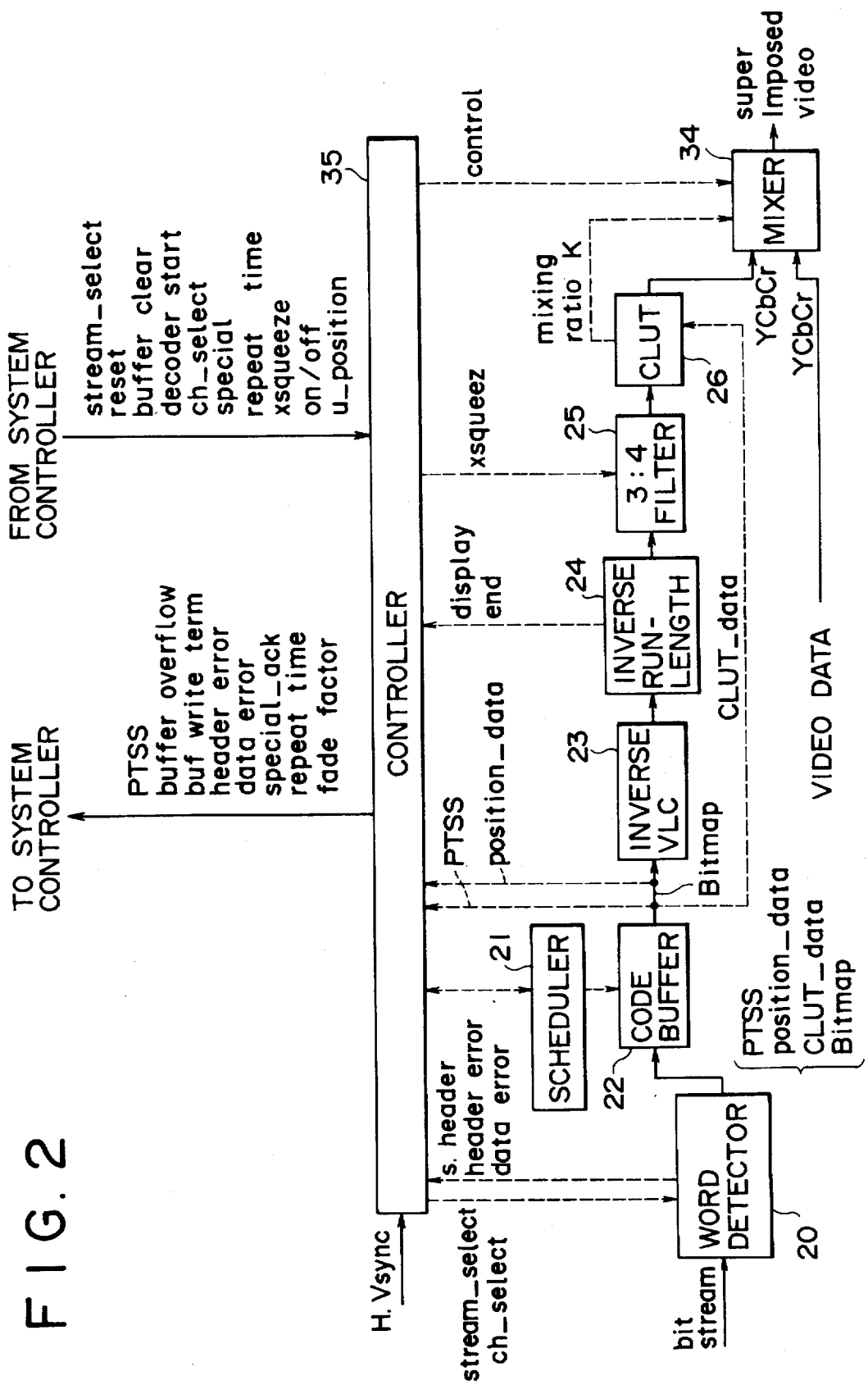

FIG. 3

(1) FROM SYSTEM CONTROLLER 14

| | bits | | |
|---|---|---|---|
| reset | 1 | SYSTEM RESET | |
| buffer clear | 1 | INSTRUCTION FOR CLEARING DATA FROM SYSTEM CONTROLLER BECAUSE OF AN ERROR IN THE CODE DATA | max 30Hz |
| decode start | 1 | STARTING THE DECODING (START OF CODE BUFFER READ) | max 30Hz |
| stream_select | 5 | DESIGNATING THE STREAM INCLUDING DISCRIMINATION OF REGULAR REPRODUCTION/SPECIAL REPRODUCTION | static |
| ch_select | 5 | DESIGNATING THE DECODE CHANNEL | static |
| special | 1 | SPECIAL REPRODUCTION | as it happens |
| repeat time | 8 | DISPLAY TIME DURING SPECIAL REPRODUCTION | as it happens |
| xsqueeze | 1 | DURING USE OF 16:9 MONITOR | static |
| on/off | 1 | SUBTITLE SUPER ON/OFF | static |
| u_position | 8 | DISPLAY POSITION DESIGNATED BY USER (VERTICAL DIRECTION OF DISPLAY SCREEN) | static |

(2) TO SYSTEM CONTROLLER 14

| | bits | | |
|---|---|---|---|
| PTSS | 33 | TIME STAMPS OF SUBTITLE DISPLAY TIME DISPLAY TIME | max 30Hz |
| buffer overflow | 1 | DATA OF TWO BANKS EXIST IN THE BUFFER | max 30Hz |
| buf write term | 1 | END OF WRITING DATA IN ONE BANK | max 30Hz |
| header error | 1 | ERROR EXISTS IN THE HEADER | max 30Hz |
| data error | 1 | ERROR EXISTS IN THE DATA | max 30Hz |
| special_ack | 1 | ACK OF SPECIAL REPRODUCTION | as it happens |
| repeat | 8 | DISPLAY TIME (BOTH REGULAR AND SPECIAL REPRODUCTION) | max 30Hz |
| v.position | 8 | DISPLAY POSITION DURING ENCODING | max 30Hz |
| fade factor | 4 | FADE-IN / OUT TIME | max 30Hz |

FIG. 4

---
(1)(2): 8bit bus+4bit select+1bit I/O others: real signal bits

---

(3) from generator      bits

H sync      1

V sync      1

13.5Mbz clock      1

(4) from demux data stream      8 strobe      1 error      1

(5) to code buffer address      15 data      8 xce      1 xwe      1 xoe      1

(6) from video decoder video data(4:2:2)      16

(7) to DAC video data(4:2:2)      16

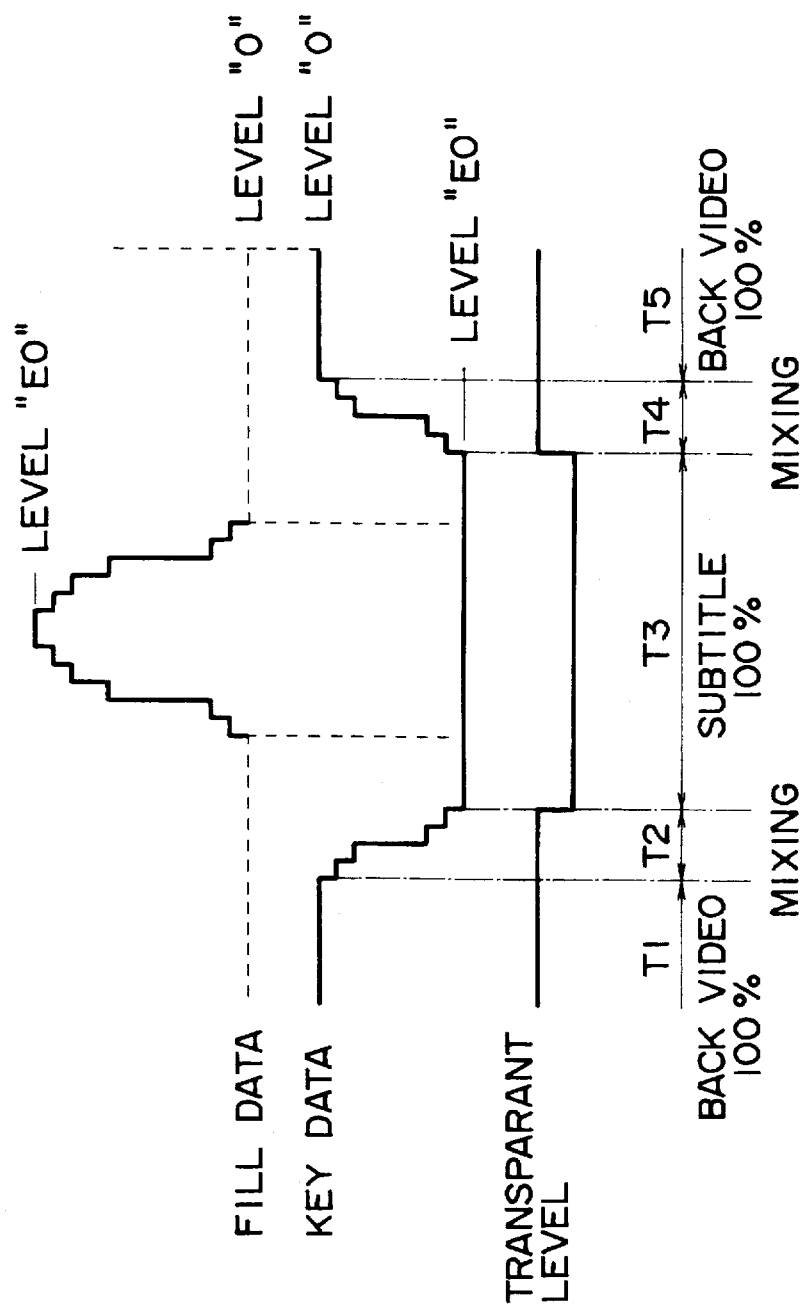
FIG. 5A
FIG. 5B
FIG. 5C

FIG. 6

| Addr | Y  | Cr | Cb | K   |
|------|----|----|----|-----|
| 0    | 00 | 7F | 7F | 00  |
| 1    | 00 | 7F | 7F | 20  |
| 2    | 00 | 7F | 7F | 40  |
| ⋮    |    |    |    |     |
| 6    | 00 | 7F | 7F | C0  |
| 7    | 00 | 7F | 7F | E0* |
| 8    | 00 | 7F | 7F | E0  |
| 9    | 20 | 7F | 7F | E0  |
| ⋮    |    |    |    |     |
| E    | C0 | 7F | 7F | E0  |
| F    | E0 | 7F | 7F | E0  |

\* E0 : SUBTITLE DATA 100%

: VIDEO DATA 0%

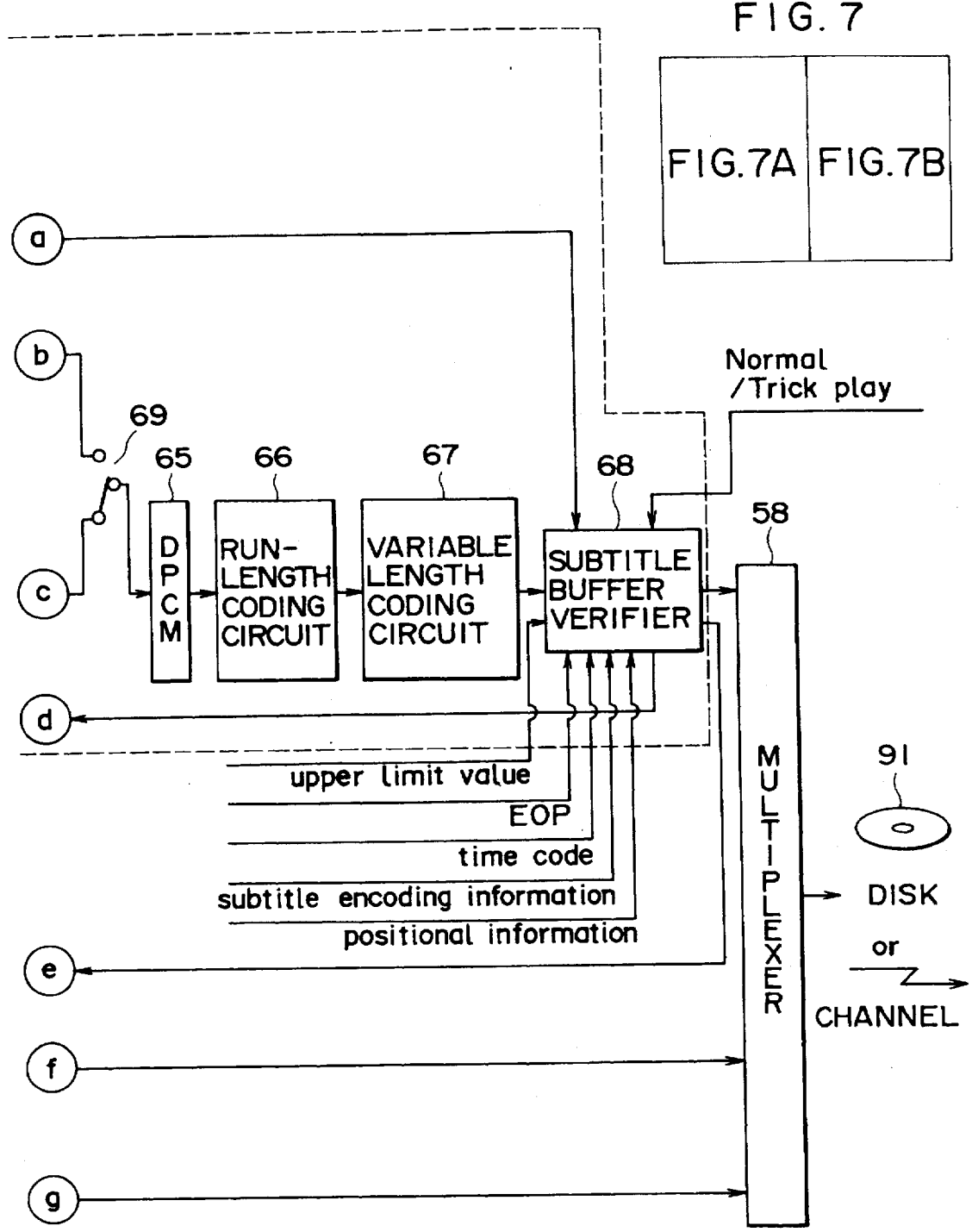

FIG. 7A
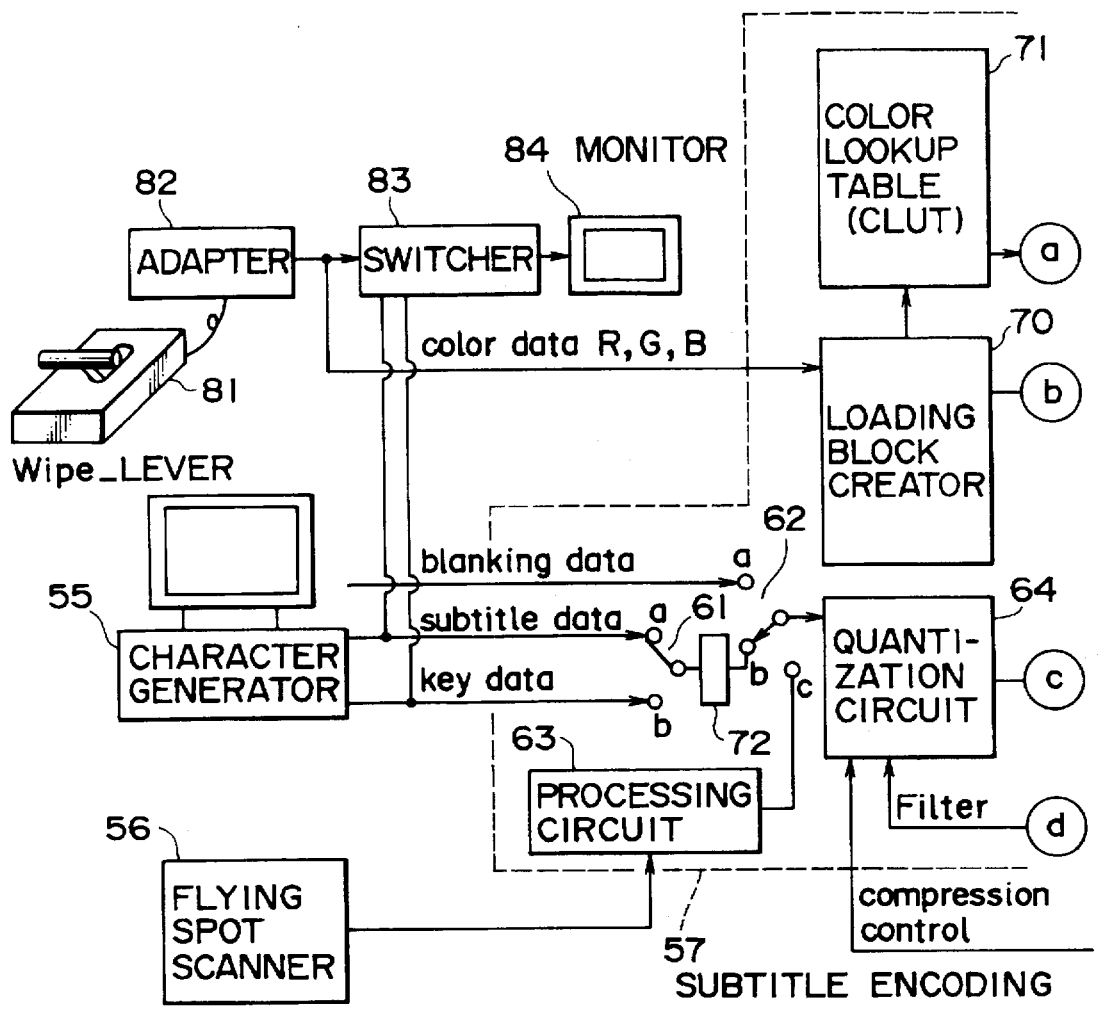
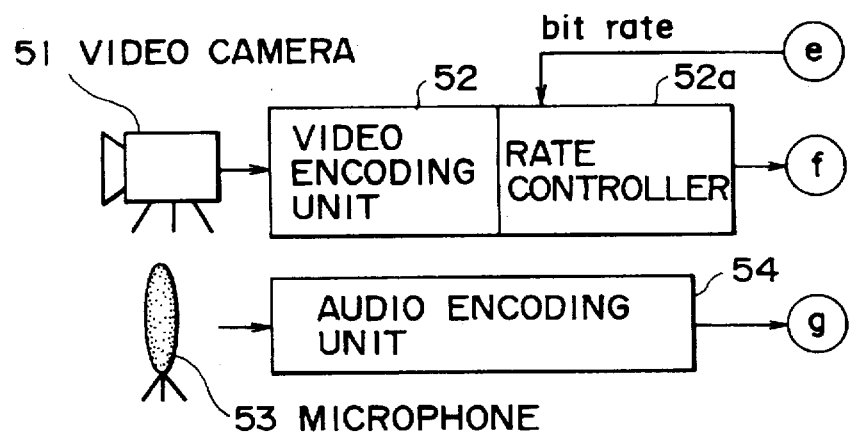

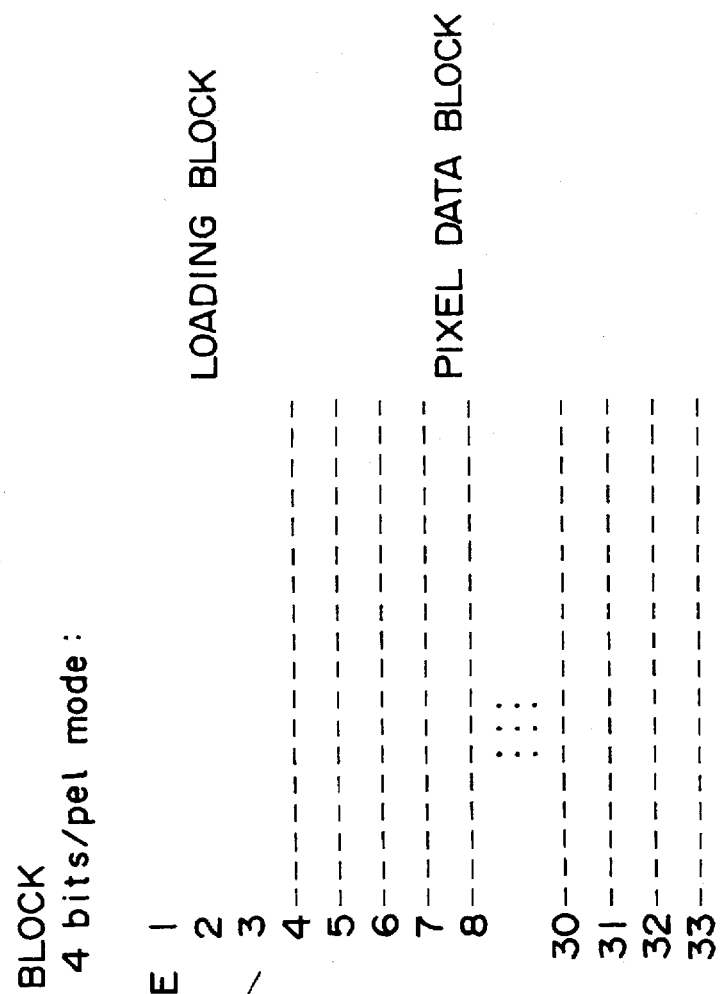
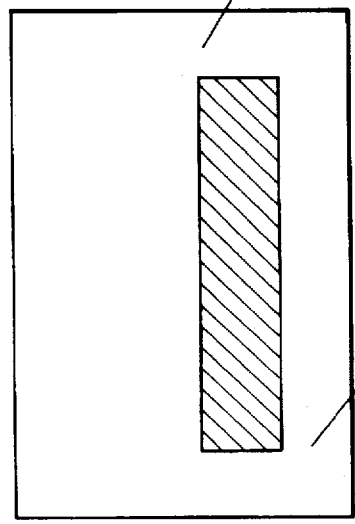

FIG. 9

CONSTRUCTION OF LOADING BLOCK:

FIG. II
WIPING CONTROL BLOCK DIAGRAM

FIG. 12

COLOR LOOKUP TABLE

| Addr | Y  | Cr | Cb | K  |
|------|----|----|----|----|
| 0    | 00 | 7F | 7F | 00 |
| 1    | 20 | 7F | 7F | 40 |
| 2    | 40 | 7F | 7F | 80 |
| 3    | 60 | 7F | 7F | C0 |
| 4    | 80 | 7F | 7F | F0 |
| 5    | A0 | 7F | 7F | F0 |
| 6    | C0 | 7F | 7F | F0 |
| 7    | E0 | 7F | 7F | F0 |
| 8    | 00 | FF | FF | 00 |
| 9    | 20 | FF | FF | 40 |
| A    | 40 | FF | FF | 80 |
| B    | 60 | FF | FF | C0 |
| C    | 80 | FF | FF | F0 |
| D    | A0 | FF | FF | F0 |
| E    | C0 | FF | FF | F0 |
| F    | E0 | FF | FF | F0 |

1 Block → 75 Hz

1 Frame → 75 × 98 Hz subcode bit rate = 7.35 KBytes/s

TRANSMISSION FORMAT

SUBTITLE DATA ENCODING/DECODING METHOD AND APPARATUS AND RECORDING MEDIUM FOR THE SAME

BACKGROUND OF THE INVENTION

The present invention relates to a superimposed subtitle encoding/decoding method and apparatus and a recording medium thereof. The invention permits a change in the display of superimposed subtitle data on the video image.

Superimposed subtitles are generally displayed at the bottom of the display screen when audiences watch foreign movies. In a video disk and in an ordinary television broadcast program, the video signal is recorded or broadcast after the subtitles are superimposed on the video pictures.

In another system, such as the CAPTAIN system, the superimposed subtitles are transmitted as character codes or dot patterns.

In CD-G (graphics) subcodes can be used to record graphics. These subcodes can also be used to record the superimposed subtitle data.

A data format of a CD-G is explained below. As shown in FIG. 13A, the data of one video frame is formed of a subcode of one byte and data of 32 bytes. Twenty-four (24) of the data bytes are assigned to six samples in each channel. Thus, two bytes are assigned per sample in channels L and R. The remaining eight bytes of the 32 data bytes are assigned to error correcting code (erc).

As shown in FIG. 13B, the subcodes of 98 frames from frame 0 to frame 97 are collected to form one block. FIG. 13C shows the detail of this subcode block.

As shown in FIG. 13C, the byte of each subcode of the block is indicated by dividing the subcode into eight channels designated as P, Q, R, S, T, U, V and W. The subcodes of frame 0 and frame 1 are designated as the synchronous patterns of S0 and S1 and various subcode data items are recorded in the subcodes of the remaining 96 frames. Search data is assigned to channels P and Q. Therefore, graphics data can be assigned to the 576 (6×96) remaining bits from channels R to W.

In this case, the data of one block is transmitted with a frequency of 75 Hz, so the amount of subcode data of one frame to be transmitted becomes 7350 (75×98) bytes. Namely, the subcode transmission bit rate is 7.35 KByte/s.

FIG. 14 shows a transmission format for transmitting the graphics data by defining the 576 graphics data bits in a block as one packet.

As shown in FIG. 14, one packet is formed of 96 symbols. Each symbol is defined by the six data bits of each channel from channels R to W. Each packet includes four packs. Therefore, each pack contains 24 symbols, symbols 0 to 23.

A mode information is assigned to the three bits of symbol 0 corresponding to channels R, S, T in each pack, while an item information is assigned to the three bits of symbol 0 corresponding to channels U, V, W in each pack. Various mode item information identify the following modes:

| Mode | Item | |
|------|------|---|
| 000 | 000 | 0 mode |
| 001 | 000 | Graphics mode |
| 001 | 001 | TV-graphics mode |
| 111 | 000 | User mode |

An instruction is assigned to symbol 1. Parity informational and additional information other than mode, item or instruction information are assigned to symbols 2 to 7. Parity information for the data of symbols 0 to 19 are assigned to symbols 20 to 23. Therefore, substantive graphics data can be assigned to the 12 symbols from symbol 8 to symbol 19.

In the transmission format, the graphics data can be assigned in a similar manner to binary data in the range of 72 (6×12) pixels of each pack of a CD-G. The pack transmission rate becomes 75 (Hz)×4 (pack) which is equal to 300 packs per second. Therefore, when it is assumed that one character is assigned to the 72 pixels of each pack, 300 characters can be transmitted per second.

Since 288 (horizonal pixels)×192 (lines) in a CD-G define one display screen, the transmission of the characters in one display screen requires 2.56 seconds. This time period is expressed in the following formula:

(288/6)×(192/12)+300=2.56 (sec).

When a hexadecimal expression is employed, four bits are required to represent each pixel, so the pattern must be transmitted four times for one complete character pattern (one bit is transmitted during each transmission). Therefore, the transmission time becomes 10.24 seconds which is four times the 2.56 second transmission time explained above.

However, superimposed subtitles in movies preferably change as the video images progress, for example, like a display of words of a song in a KARAOKE system. The lengthy transmission time of the above display method makes it impossible to change the superimposed subtitle in sufficient time for the subtitles to progress with the video image.

The display of the superimposed subtitles can be turned ON or OFF during the ordinary reproduction operation of the CAPTAIN system or a CD-G, however, there is also the problem that the resolution of the subtitles in the above display method is not sufficient for human viewing.

The display area of each screen is defined by 248 (horizontal pixels)×192 (lines) in the CAPTAIN system, while the component digital TV signal has a resolution of 720 (horizontal pixels)×480 (lines). Therefore, the resolution of the CAPTAIN system is not sufficient when compared to that of the component digital TV signal system.

Furthermore, in a CD-G only one bit is used to represent one pixel when the data is expressed as binary data. This expression can cause, for example, the aliasing phenomenon by which the oblique area of a character is notched or the flickering phenomenon of a character becomes distinctive. The occurrence of these phenomena make it difficult and unpleasant for the viewer to read the subtitles.

A binary image can be converted into a multilevel information image to reduce the effect of these phenomena by using, for example, a filter. However, a high precision filter must be used. The high precision filter results in a cost increase and also causes the deterioration of the background image. Therefore, it is difficult to justify employing such a filter.

When a hexadecimal expression is employed for each pixel in a CD-G, about four times the amount of time is required to change the display of the subtitle data compared to when a binary expression is used. The time delay makes it difficult to change over the display of superimposed subtitles at high speed when using hexidecimal expression.

SUMMARY OF THE INVENTION

It is therefore an object of the present invention to provide a superimposed subtitle data encoding/decoding method and apparatus for changing the display of superimposed subtitles with the passage of time and also to provide a recording medium thereof.

It is also an object of the present invention to provide a superimposed subtitle data encoding/decoding method and apparatus for displaying high quality superimposed subtitles and also to provide a recording medium thereof.

In one aspect of the invention, the information necessary to change the display of the subtitle data is stored in one loading block corresponding to at least one pixel data block. Each loading block includes changeover position information for accessing a color lookup table. The color lookup table includes luminance data, chrominance data and a mixing ratio for displaying the subtitle data on the background video signal.

The loading block is used to change the display of the subtitle data and also is used to accomplish a color-wipe operation.

In another aspect of the invention, the loading block including changeover position information and the pixel data block are recorded on a recording medium.

According to the present invention, since a display of the superimposed subtitle data can be changed with the passage of time as a function of the changeover position information stored in the loading block, the display of the subtitle data, such as display color, can be changed as desired. Further, when the changeover mode is assigned to changeover the display color, a color-wipe of the superimposed words, such as in a KARAOKE system can, be realized.

Since the superimposed data can be displayed by a system, such as the NTSC/PAL systems, etc., high quality superimposed subtitles can be displayed.

BRIEF DESCRIPTION OF THE DRAWINGS

These and other objects, features and advantages of the present invention will become more fully apparent from the following detailed description taken with the accompanying drawings.

FIG. 1 is a block diagram of a superimposed subtitle data decoding apparatus according to the present invention;

FIG. 2 is a block diagram of a subtitle decoder of the apparatus of FIG. 1 according to the present invention;

FIG. 3 illustrates the information transmitted between the controller in the subtitle decoder and the system controller;

FIG. 4 illustrates further information transmitted between the controller, the system controller and other circuits in the decoding apparatus of the present invention;

FIGS. 5A to 5C are diagrams for explaining how to encode the superimposed subtitle data according to the present invention;

FIG. 6 illustrates an example of the color lookup table according to the present invention;

FIGS. 7, 7A and 7B illustrate an example of an encoding system according to the present invention;

FIGS. 8A and 8B illustrate a block constructed of a loading block and a pixel data block according to the present invention;

FIG. 9 illustrates a construction of the loading block according to the present invention;

FIG. 12 illustrates an example of the color lookup table used in the color-wipe operation of the present invention;

DESCRIPTION OF THE PREFERRED EMBODIMENT

Figure 10:
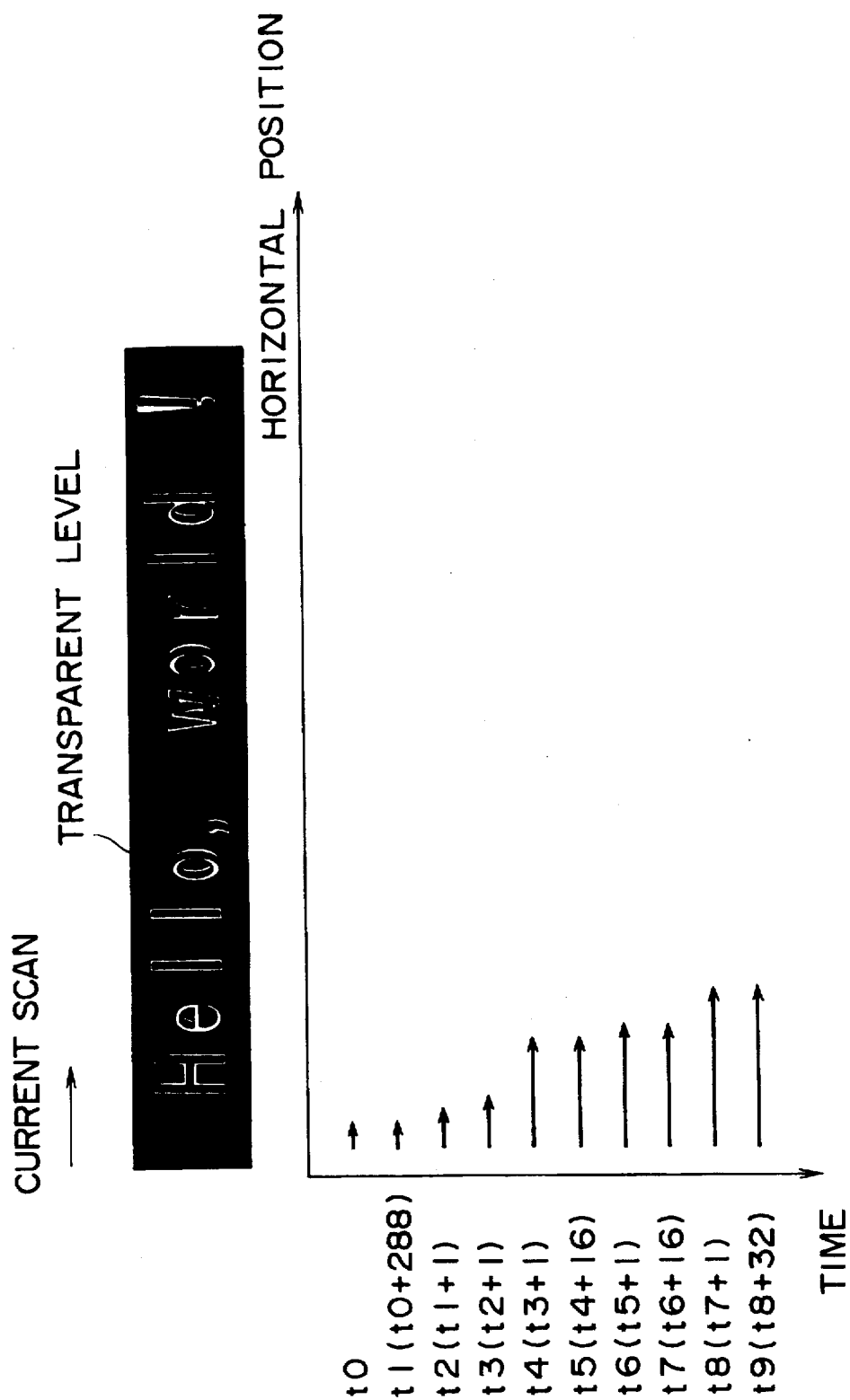
FIG. 10 illustrates an example of the color-wipe operation according to the present invention.

FIG. 1 shows a block diagram of an embodiment of a data decoding apparatus for carrying out the superimposed subtitle data decoding method according to the present invention.

In FIG. 1, a reproduced signal, for example, a multiplexed signal read from a data recording medium, such as a disk, through a servo system (not shown) is input to a data decoder and demultiplexer 1. An Error Correcting Code (ECC) is decoded for error correction and the input multiplexed data is demultiplexed to form video data, subtitle data and audio data in the data decoder and demultiplexer. The video data is supplied to a video decoder 3, the subtitle data is supplied to a subtitle decoder 7 and the audio data is supplied to an audio decoder 11.

A memory 2 is used as a buffer memory, work area, and the like to execute the processing in the data decoder and demultiplexer.

The video decoder decodes the bit stream of input video data by utilizing a memory 4 and supplies the decoded video data to a letter box 5.

When an output of the video decoder is in the squeeze mode, filter processing is performed in the letter box for displaying an image reduced by ¾ in the vertical direction so that the display can be observed with the roundness of 100% on a display screen having a height and width ratio of 4:3. In this case, timing adjustment corresponding to ¼ field is conducted. A memory 6 is used for the timing adjustment.

The letter box has a data path for directly outputting the video data in the squeeze mode.

Audio decoder 11 decodes audio data by utilizing a memory 12 as a buffer memory or the like. The decoded audio data is reproduced and output as an analog audio signal by means of an audio digital/analog (D/A) converter 13.

Subtitle decoder 7 decodes a bit stream of the subtitle data supplied thereto and superimposes the decoded subtitle data onto the video data output from letter box 5.

The video signal to which the subtitle data is superimposed is converted into the NTSC, PAL, or SECAM system by a composite encoder 8 and is then output and converted to an analog video signal by a D/A converter 10 for display.

The processing of each section explained above is controlled by a system controller 14. A mode display 9 is provided to monitor user commands and the various other information so that such information can be displayed on display unit provided in the mode display and/or can be superimposed on the video signal.

Subtitle decoder 7 decodes a bit stream of subtitle data having regular reproduced subtitle data and special reproduced subtitle data multiplexed thereto. The subtitle decoder, therefore, receives the bit stream of the multiplexed subtitle data and decoded video data and decodes the multiplexed subtitle data in the designated timing after storing this data in a code buffer, such as code buffer 22 in FIG. 2. The subtitle decoder then can superimpose the subtitle data, depending on the reproduction mode, on the decoded video data.

A block diagram of the preferred embodiment of the subtitle decoder is shown in FIG. 2. Each section indicated in this figure is explained hereunder.

(1) Word detector 20

The bit stream of subtitle data output from data decoder and demultiplexer 1 is input to a word detector 20. The word detector detects header information, header error information and data error information and transfers this information to a controller 35. A time stamp (PTSS) of the subtitle display time, display position information (Position Data), updated data of a color lookup table (CLUT) and bitmap pixel data are detected by the word detector and are transferred and stored in code buffer 22.

(2) Scheduler 21

A read/write access control of the code buffer is executed by a scheduler 21. A bandwidth of read/write access of the code buffer is determined from the scheduling control of memory access which is, in turn, dependent on the data rate and display rate of the data transmitted from the data decoder and demultiplexer.

For example, when the maximum data rate from the data decoder and demultiplexer is 20 Mbps, the data is written to code buffer 22 at the rate of at least 2.5 MHZ when the I/O port of the code buffer is 8 parallel bits.

Data is read from the code buffer as a function of the timing derived from the vertical synchronous signal (V sync) and the horizontal synchronization signal (H sync) in combination with the display position information multiplexed in the header of the subtitle data after the decoding start signal is received from system controller 14. The readout operation rate is the pixel sampling rate of 13.5 MHZ. If, for example, the read/write operation in the code buffer is changed with the sampling clock, the lowest possible rate to satisfy the write operation is 3.37 MHZ, since a rate of at least 2.5 MHZ is necessary, as explained above. A 3.375 MHZ rate is equal to ¼ of the 13.5 MHZ pixel sampling rate.

That is, the 3.375 MHZ timing is used to write data to the code buffer and the remaining timings of the pixel sampling rate are used to read data from the code buffer. Thereby, only one clock phase from among the four clock phases of the 13.5 MHZ clock is assigned for writing, while the remaining three clock phases are assigned for reading.

The number of bits which can be read by the three clock phases is 24 (3×8) bits because the I/O port is 8 bits. The display of these 24 bits can be executed on a real time basis without any intermission when data of one pixel is constituted by six bits or less because six (6=24÷4) bits can be assigned to one phase of the four clock phases.

(3) Controller 35

A controller 35 receives the time stamp (PTSS) of the subtitle display time from word detector 20 and outputs it to system controller 14. After the decoding start signal is sent from system controller 14, controller 35 starts the decoding of the subtitle data.

When the regular reproduction mode is set, the regular reproduction subtitle data is repeatedly read from code buffer 22 as long as the repeat time is byte-aligned in the frame unit and the subtitle data is decoded. The repeat time can be either a predetermined number of frames or a predetermined time duration during which the same subtitle data is displayed. When the repeat time represents a number of frames, its value is reduced as a function of a subtraction or decrement pulse supplied from the system controller. The decrement pulse is generated from the system controller at the frame rate during regular reproduction. When the repeat time equals zero, another subtitle data is displayed. Controller 35 receives the decrement pulse and executes address management of the code buffer for scheduler 21 so that the correct synchronization is established between the video image and the subtitles based on the display time stamp. The same analysis applies when the repeat time represents a duration of time, however, the decrement pulse reduces the repeat time to zero by a frame period each cycle.

When a special signal sent from system controller 14 is recognized as "abnormal", controller 35 returns, upon discrimination of the special reproduction mode, an ack signal to the system controller indicating that the special reproduction mode has been correctly received. When the special reproduction mode is set to the n-time fast-feed (FF) or n-time reverse fast-feed (FR), the decrement pulse is issued at the n-time rate rather than the field rate described above. When such FF or FR special reproduction mode is set, the special reproduction subtitle data is selected, read from code buffer 22 and decoded. In this case, the repeat time is reduced by the decrement pulse at a corresponding n-time rate. If the special mode is set to pause, the decrement pulse is not issued and the same frame is repeatedly decoded. Thus, the image and subtitles are maintained in synchronism for display.

The subtitle data is read from the code buffer and variable length decoded in an inverse variable length coding (VLC) circuit 23. An End of Page (EOP) is detected in an inverse run-length circuit 24, which also performs the run-length decoding process on the subtitle data. When the count value of EOP is equal to the repeat time, the inverse run-length circuit sends a display end flag to controller 35. In response to the display end flag, the controller stops the read operation from reading the subtitle data from code buffer 22. The EOP is used to check if the data was decoded correctly because an EOP is detected each time the bitmap of the subtitle data is processed.

When word detector 20 detects the EOP of the next page before the controller receives the display end flag, the controller generates a buffer overflow signal to system controller 14 to stop the transfer of data from data decoder and demultiplexer 1.

The display start position is updated for each frame when an instruction is issued from the system controller.

(4) Code buffer 22

Code buffer 22 is preferably made of RAM (Random Access Memory) and must have the capacity to store at least two pages of data whether the buffer is provided externally or internally. Since most large capacity memory devices for high speed access have only one port per page for both reading and writing data, the two page capacity allows one page to be read through its port, while the other page is being written to through its port. Thus, read/write conflicts can be avoided. The choice of an external or internal code buffer is a design choice and varies with the desired configuration of the decoding system. RAM is preferred because it includes the ability to compensate for delays in the decoding process of the video data and also satisfies the extra bandwidth for access by scheduler 21.

To compensate for delays in the decoding process, controller 35 sends the time stamp of display time (PTSS) to system controller 14 when the subtitle data is written to the code buffer.

The system controller sends the decoding start instruction to controller 35 in subtitle decoder 7 after reception of the time stamp. The decoding start instruction is timed to take account of the processing delay by letter box 5 and the delay of the video decoder (about 1 field) from the time when the synchronous clock in the system controller matches the PTSS.

This series of decoding delays is considered because the multiplexing is performed in the data encoding unit under the precondition that the delay between the video data, audio data and subtitle data is zero.

(5) Inverse VLC circuit 23

Inverse VLC circuit 23 executes variable length decoding on the subtitle data read from the code buffer and outputs the decoded data as pairs of level data and run data. The inverse VLC circuit does not effectuate its function under certain conditions.

(6) Inverse run-length circuit 24

Inverse run-length circuit 24 executes run-length decoding by generating an amount of level data equal to the run data. The inverse VLC circuit and the inverse run-length circuit expand the compressed subtitle data.

(7) 3:4 filter 25

When an aspect ratio of the monitor is 4:3, 3:4 filter 25 processes the subtitle data, which has been squeezed horizontally, to increase its roundness to 100%. After the subtitle data is modified, it is superimposed on the video data. In this case, controller 35 reads data from code buffer 22 based on the H sync pulse, for example, as quickly as the time corresponding to 90 pixels from the H-sync pulse.

When the aspect ratio of the monitor is 16:9, the signal bypasses the 3:4 filter. The xsqueeze signal supplied from controller 35 is used to determine whether or not the signal bypasses the 3:4 filter.

When the bit stream of a plurality of subtitle data using a plurality of fonts is transmitted, the bit stream bypasses the 3:4 filter.

(8) Color lookup table (CLUT) circuit 26

Luminance data Y, color difference data Cr, Cb, and key data K, which indicates a mixing ratio between the background data and the selected luminance data Y and the color difference data Cr, Cb, are stored in the color lookup table (CLUT), for example, as shown in FIG. 6. These data items are defined as 8 bits in full scale, but as shown in FIG. 6, they can be converted to an accuracy of 4-bits. Such a CLUT can be previously downloaded to a CLUT circuit 26 from code buffer 22.

The key data K is transmitted to a mixer 34 from the CLUT circuit as a mixing ratio. It is also possible to provide a CLUT as shown in FIG. 12 for realizing color-wipe which changes with the passage of time by utilizing the most significant bit of the input address.

(9) Mixer 34

Mixer 34 superimposes, when the on/off superimpose signal is "on", the subtitle data read from the CLUT circuit as Y, Cb, Cr data on the video data input as Y, Cb, Cr data based on the mixing ratio K. These data items are superimposed at a predetermined position depending on the position signal or u_position signal supplied from controller 35.

When the mode information is designated as a fade coefficient, the pattern data of the subtitle data is multiplied by the fade coefficient at a specified rate to fade in or fade out the subtitles.

When the superimpose signal is "off", only the video data input to the mixer is output for display. The user may freely set the superimpose signal.

The contents of various data items supplied to system controller 14 from controller 35 and the contents of various data items supplied to the controller from the system controller are indicated in FIGS. 2, 3 and 4. FIG. 4 also illustrates various data items sent to or from other circuits in the decoder system described above.

Next, an example of encoding the subtitle data in the 4-bit encoding mode in the data encoding unit of the present invention will be explained with reference to FIGS. 5A to 5C and FIG. 6.

The subtitle data is expressed as fill data and the mixing ratio is expressed as the key data, as shown in FIGS. 5B and 5C, respectively. In this example, the letter A is to be displayed as the subtitle data, as shown in FIG. 5A. The fill data obtained by scanning this letter with a single horizontal scanning line is indicated in FIG. 5B.

The fill data is set to a level corresponding to the luminance signal Y of the letter to be displayed in the period T3. In the periods T1, T2 before and the periods T4, T5 after the period T3, the fill data is set to the lowest level "0". The level of the fill data controls the luminance level of the subtitle data displayed. The fill data varies the luminance level from the black level to the very bright level as the fill data changes from "0" to "E0".

The key data is set to its lowest level "E0" in the period T3 to display the subtitle. The key data is set to its highest level "0" in the isolated periods T1 and T5 before and after the period T3. When the key data is set to the "0" level, the subtitle signal is most attenuated as the mixing ratio of the background video signal is 100%. However, when the key data is set to the "E0" level the mixing ratio of the background video signal is 0% and the subtitle can be clearly seen by the viewer.

The key data is set to predetermined intermediate levels in the periods T2 and T4 between the period T3 and periods T1 and T5, respectively. That is, in period T2 the key data level gradually changes to the lowest level "E0" from the highest level "0", while in period T4 the key data level gradually changes to the highest level "0" from the lowest level "E0".

In the periods T2 and T4, the background video is attenuated at a rate according to the value of the key data. In this example, the larger the value of the key data, the faster the rate of attenuation of the background video. Accordingly, the smaller the value of the key data, the slower the rate of attenuation of the background video.

As explained above, the background video is gradually muted in the vicinity of a letter or character to enable the viewer to more easily read the subtitles while watching the video images on the screen.

The color lookup table (CLUT) shown in FIG. 6, for example, is the table in the 4-bit encoding mode used for reference at the time of encoding.

When the address (Addr) varies from 0H to 7H, the key data K is stored in the eight (8) steps of 00H→20H→40H→60H→···→E0H and the fill data (luminance data Y) is defined as 00H. When the address varies from 8H to FH, the key data is defined as E0 and the fill data is stored in the eight steps of 00H→20H→40H→60H···E0H. In each case, the color difference data Cr, Cb are defined as 7FH.

When reference is made to the color lookup table during the encoding process, an address (Addr) corresponding to the data of each sampling timing shown in FIGS. 5B and 5C is output as the encoded data from a quantization circuit 64, as will be explained below.

FIGS. 7A and 7B are a block diagram of an encoding system in which a subtitle data encoding unit of the present invention is utilized.

In this encoding system, a video signal output from a video camera 51 is supplied to a video encoding unit 52 for analog/digital (A/D) conversion and is then compressed and packeted before being supplied to a multiplexer 58.

The reproduced video signal can also be supplied to the video encoding unit using a video disk player or video tape recorder in place of the video camera.

The video encoding unit is provided with a rate controller 52a so that when a small amount of data is encoded, the rate is controlled by subtitle data encoding unit 57 to increase the amount of the encoded video data. When a large amount of data is encoded, the rate is controlled to reduce the amount of encoded video data. Thus, the rate is controlled to keep the total amount of encoded data constant.

An audio signal collected by a microphone 53 is input to an audio encoding unit 54. The signal is A/D converted, compressed, encoded and packeted in the audio encoding unit before being supplied to multiplexer 58. An audio signal reproduced from a tape recorder or the like in place of the microphone can also be supplied to the audio encoding unit.

Subtitle data generated by a character generator 55 or subtitle data output from a flying spot scanner 56 is supplied to subtitle data encoding unit 57. In the subtitle data encoding unit, subtitle data is encoded with reference to color lookup table 71, an example of which is shown in FIG. 6. The subtitle data is compressed, encoded and packeted before it is supplied to the multiplexer.

The multiplexer multiplexes the packeted data supplied respectively from video data encoding unit 52, audio data encoding unit 54 and the subtitle data encoding unit. The multiplexed data is error corrected according to ECC and modulated, for example, by EFM (Eight to Fourteen Modulation) in the multiplexer. The multiplexed data is then recorded in a recording medium, for example, such as a disk 91 or is transmitted/broadcast through a channel.

Subtitle data encoding unit 57 will be explained below.

Character generator 55 generates subtitle data corresponding to the video image encoded by video encoding unit 52. This subtitle data is input to the subtitle data encoding unit. The subtitle data is supplied to contact (a) of a switch 61 and the key data K generated by the character generator is supplied to contact (b) of switch 61. This switch is changed from contact (a) to contact (b) at a predetermined timing to select the subtitle data or key data K to be supplied to quantization circuit 64. The selected data is supplied through a filter 72 and a switch 62 to the quantization circuit.

The subtitle data input to the quantization circuit is quantized therein with reference to color lookup table (CLUT) 71 and is then encoded in a DPCM circuit 65 according to a differential PCM code. Thereafter, compression encoding is executed in a run-length encoding circuit 66 and a variable length encoding circuit 67 utilizing deflection of a code appearing frequency.

When the subtitle data is expressed in eight gradations, a 4-bit address (Addr) corresponding to a luminance value Y and key data K of the subtitle is obtained with reference to CLUT 71, an example of which is shown in FIG. 6.

It is also possible to transmit the color lookup table to the decoding apparatus so that the color lookup table is identical during the encoding and decoding operations. In that case, the color lookup table, which is created by a loading block creator 70, is multiplexed and then recorded or transmitted through a subtitle buffer verifier (SBV) 68 to the decoding circuit.

In the decoding circuit, the transmitted color lookup table is input to CLUT circuit 26, thus the data input can be decoded with reference to the same color lookup table with which it was encoded. In CLUT 71, luminance data Y, color difference data Cr, Cb and the key data K indicating a mixing ratio with the background image are respectively stored in a maximum of 8 bits, for example, as shown in FIG. 6.

In the encoding system, the video data, audio data and subtitle data are respectively packeted and are multiplexed by multiplexer 58. Each packet is provided with additional header data including attribute information of the data, which are read and separated in the decoding operation in data decoder and demultiplexer 1 by detecting the packet header. The header of the subtitle data includes the information which indicates the data to be decoded in the regular reproduction mode or the data to be decoded in the special reproduction mode.

In subtitle data encoding unit 57, various kinds of control information (normal/trick PLAY, position information, subtitle encoding information, time code, EOP, upper limit value, etc.) are added to the bitmap of the subtitle pattern data by subtitle buffer verifier (SBV) 68. The amount of data to be stored in the buffer is verified in the SBV to adjust the amount of encoded data, which prevents the occurrence of a data overflow or underflow. This control is executed by the SBV which controls rate controller 52a and the quantization level of quantization circuit 64 based on the amount of data to be stored in the buffer.

The quantization level can be changed in several stages. The quantization bit rate of the quantization circuit can also be adjusted depending on the quantization level width. Therefore, quantization can be realized at the necessary bit rate.

Figure 9:
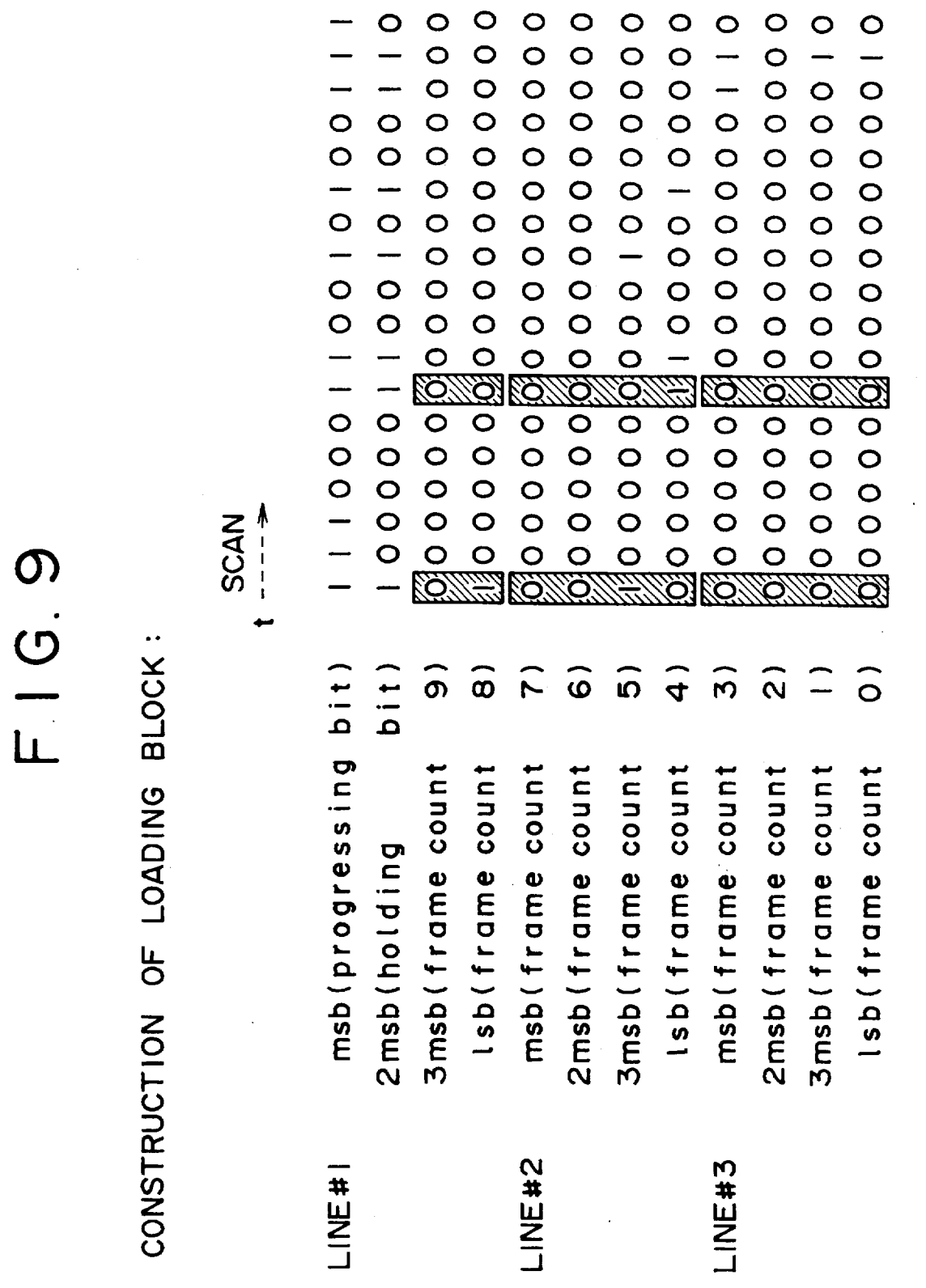

The features of the present invention will now be explained with reference to FIGS. 8A and 8B to FIG. 12.

FIGS. 8A and 8B show a subtitle display block which is formed of a loading block and a pixel data block. As shown in FIG. 8B, the first three lines of the subtitle display block are assigned to the loading block in the 4-bit encoding mode. However, the first six lines are assigned to the loading block in the 2-bit encoding mode (not shown).

Lines 4 to 33 are assigned to the pixel data block in the 4-bit encoding mode, while lines 7–33 are assigned to the pixel data block in the 2-bit encoding mode. The pixel data block contains bitmap data of the subtitle data to be displayed on the screen.

The loading block is composed of a progressing bit (P bit) used to update a change position of the color lookup table, a holding bit (H bit) for controlling the update of the change position in the next frame when the same CLUT changeover information continues for a plurality of frames, and a frame count value of 10 bits indicating the number of frames that the changeover information remains the same.

The changeover information is represented by the P bit, H bit and frame count value bits. This information is used to progress a color-wipe operation or change the display of a subtitle data at a predetermined position in the video image called the change position.

The loading block is generated by loading block creator 70 in subtitle encoding unit 57, shown in FIGS. 7A and 7B, from wipe data.

Position information from a wipe lever 81 is input to the loading block creator via an adaptor 82. The loading block creator samples the input data stream at a frame interval and forms the information into the format shown in FIG. 9.

The wipe information is mixed with the subtitle information from character generator 55 in a switcher 83 and is then output to a monitor 84 for trial display to check the wipe display.

FIG. 9 shows sample contents of data in the loading block of the 4-bit encoding mode. The first MSB of line 1 indicates the P bit, while the second MSB thereof indicates the H bit. The third MSB and LSB of line 1 indicate the 10th and 9th bits, respectively, of the frame count value. The frame count value indicates the time duration of the subtitle display. The third MSB and LSB of line 1 are the MSB and second MSB bit of the frame count value.

The respective four bits of line 2 and line 3 indicate the 8th to 5th bits of the frame count value and the 4th to 1st bits of the frame count value.

The color-wipe operation will be explained with reference to FIG. 10. A subtitle "Hello, world!" generated from character generator 55 is displayed subject to a color-wipe. Times t0, t1, t3, . . . t9 are indicated on the vertical axis showing the frame position, while the horizontal axis indicates the horizontal position.

FIG. 10 is explained hereunder.

The subtitle data is initially displayed at time t0. The color-wipe progresses one pixel and is delayed for a period of about 10 seconds, 288 frames, after the subtitle pattern is displayed because the H bit is set to "1" and the frame count equals 288.

At time t1, which is set to about 10 seconds after the time t0, the delay started at time t0 ends.

At time t2, the color-wipe progresses one pixel. There is no delay at time t2 because the H bit is set to "0". The color-wipe progresses from the horizontal position at time t2 to the next pixel position based on the P bit being set to "1".

At time t3, the color-wipe progresses one more pixel.

At time t4, the color-wipe progresses four pixels. At this time, the color-wipe is held for 16 frames, about 0.5 seconds, based on the H bit and the value of the frame count. When the P bit is set to "0" the pixel position is jumped over, therefore at time t4, the color-wipe progresses by jumping over three pixels and progresses one pixel based on the P bits.

At time t5, the color-wipe delay of 16 frames ends.

At time t6, the color-wipe progresses one pixel and is again held for about 0.5 second, 16 frames, based on the H bit and the frame count value.

At time t7, the color-wipe delay started at time t6 ends.

At time t8, the color-wipe progresses three pixels. The color-wipe is again delayed for about one second, 32 frames.

At time t9, the color-wipe delay started at time t8 ends.

In this timing, the color-wipe progresses and thereby the display color of the subtitle "Hello, world!" changes from the left to the right. The progression and delay of the color-wipe operation are controlled according to the information in the loading block, for example, as shown in FIG. 9.

Figure 11:
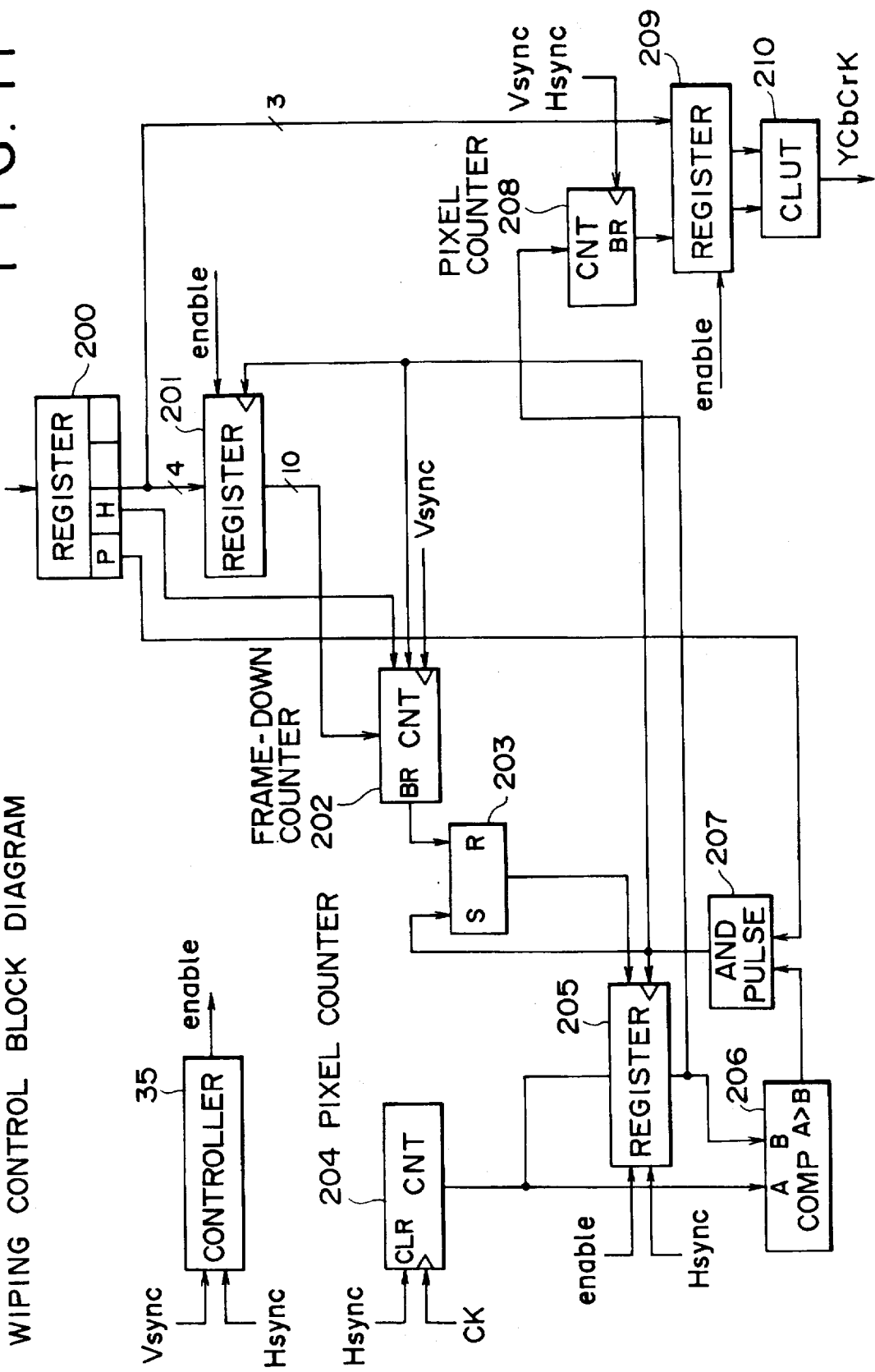
FIG. 11 is a block diagram of a subtitle data display and color-wipe control circuit according to the present invention.
Figure 13A:
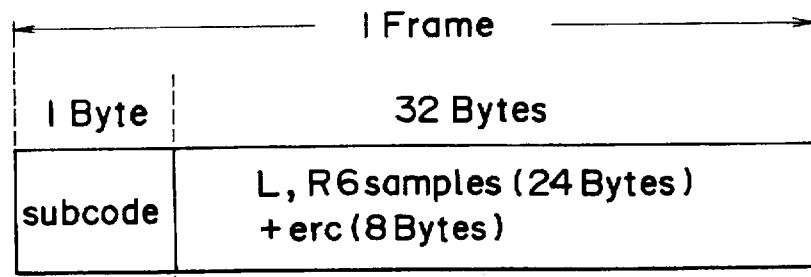
FIGS. 13A to 13C illustrate the construction of subcode data in a CD-G.
Figure 13B:
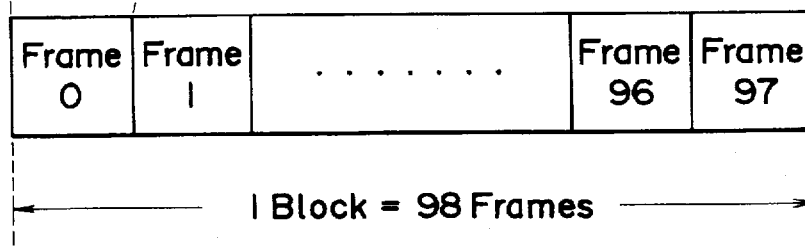
Figure 13C:
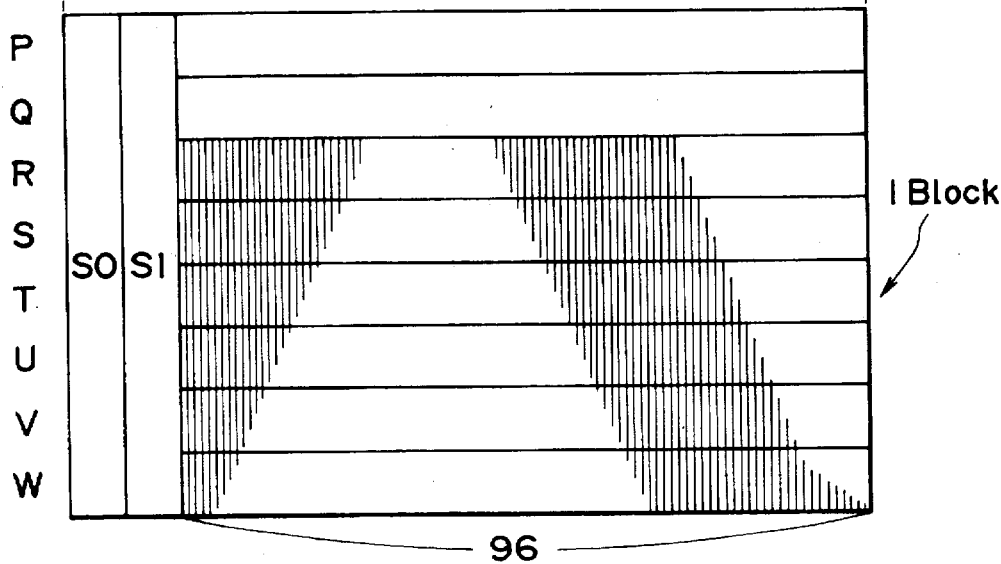
Figure 14:
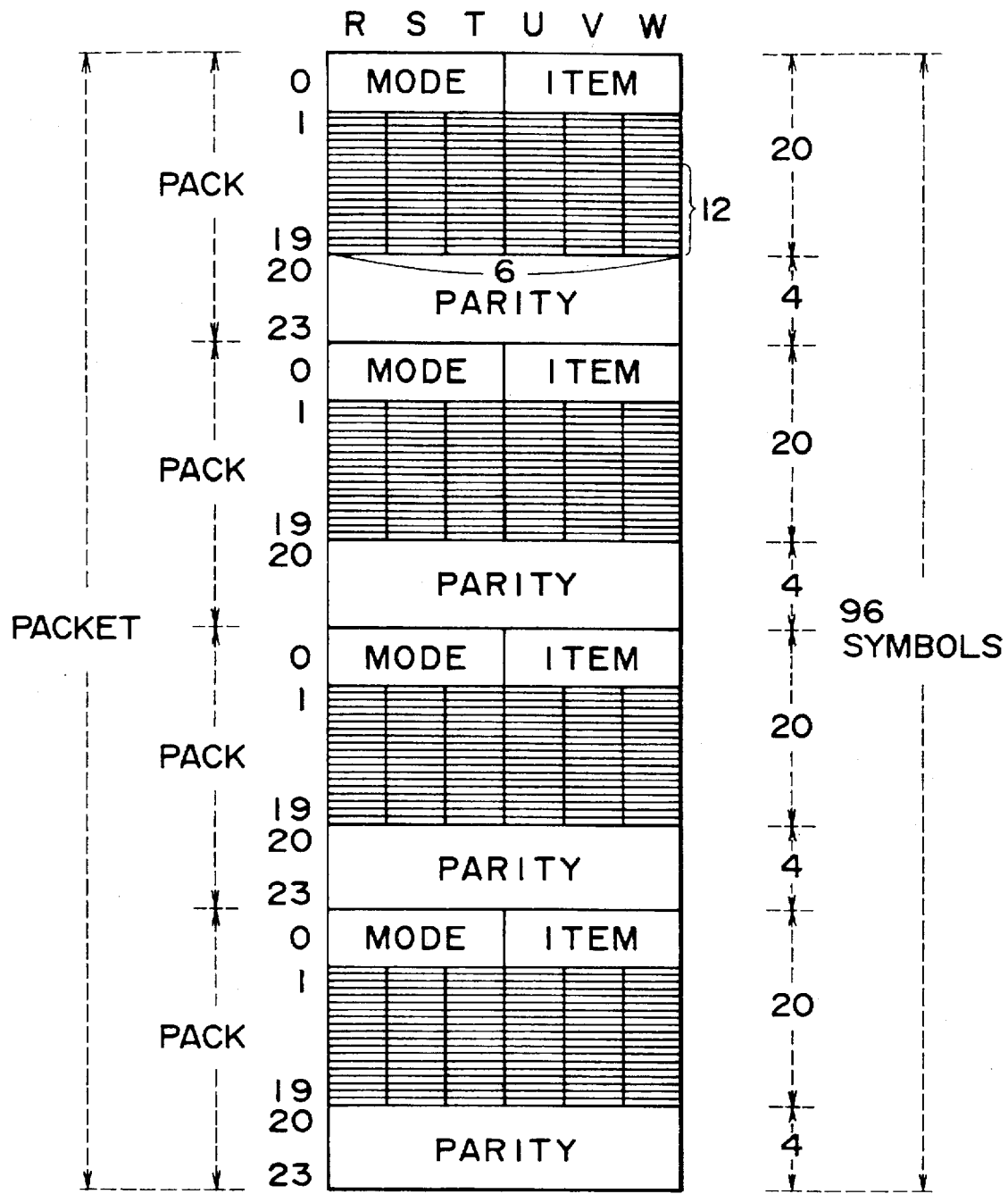
FIG. 14 illustrates recording character information using the subcodes of a CD-G.

A block diagram of a subtitle data display and color-wipe control circuit for realizing the above operation is shown in FIG. 11.

In FIG. 11, data consisting of loading blocks and pixel data blocks are input to a register 200 and the P and H bits are detected.

A pixel counter 204 is cleared with a horizontal synchronous signal (Hsync) and the clock CK is used to count the number of pixels in the horizontal direction in accordance with the column address of the loading block. When the P bit is "1", this count value is compared in a comparator (COMP) 206 with the content of a register 205 indicating the last frame position of the color-wipe. When the count value A of pixel counter 204 is larger than the value B of register 205 (A>B), a flag indicating A>B is input to register 205 as a strobe signal via an AND gate 207. This strobe signal allows the contents of register 205 to be updated. Thus, a new color-wipe address (position) is stored in register 205.

The controller 35 in subtitle decoder 7 supplies an enable signal to registers 201, 205 and 209 during the period from line 1 to line 3 of the loading block.

Register 205 is cleared in such a timing that the display timing PTS matches the clock value SCR of the system and the initial subtitle pattern is displayed.

An output of the AND gate is input to a set terminal S of a SR flip-flop 203 and to register 205 simultaneously. The input to set terminal S sets the SR flip-flop. When an output of the SR flip-flop is "0", register 205 can be updated. When the output of SR flip-flop 203 is set to "1", registers 201 and 205 are disabled and cannot be updated.

Data of 4 bits is input in each line to register 201 in series from register 200, up to three lines of the loading block are input from register 200. When the loading block is terminated, data of 10 bits indicating the frame count value, as shown in FIG. 9, are stored in register 201. Upon termination of the loading block, register 201 loads the frame count value to a frame down-counter 202.

When the frame count value is set, frame down-counter 202 executes a countdown with the vertical synchronous signal (Vsync) from the next frame. Prior to the time the value of the frame down-counter becomes zero, the SR flip-flop is held at "1" and the contents of registers 201 and 205 cannot be updated. When the count value of the frame down-counter becomes zero, the borrow output terminal (BR) of the frame down-counter becomes "1" and the SR flip-flop is reset to "0", thus, the contents of registers 201 and 205 can be updated. The end of the delay or holding period is indicated when the frame count value becomes zero, thus the color-wipe progresses and its horizontal position is updated.

When the next frame count value is set in register 201 and similar operations are repeated, the operation of the color-wipe is delayed for the period defined by the frame count value. The color-wipe position is updated in register 205, as described above, so that the color-wipe of the subtitle progresses.

An output of register 205 enables a changeover of the color lookup table in the horizontal direction of the relevant frame. The value of register 205 can be updated each frame unit. The output of register 205 is loaded to a pixel counter 208 in synchronization with the horizontal synchronous signal. Pixel counter 208 outputs "1" from its borrow output terminal (BR) when the counter value becomes zero. This output signal "1" is supplied to a color lookup table (CLUT) 210, shown in FIG. 12, as the most significant address bit (MSB) in such a timing that the pixel data block is supplied via a register 209.

In CLUT 210, different color difference signals Cb, Cr are stored based on the MSB, as shown in FIG. 12. Thus, the color information of subtitle data displayed as a function of CLUT 210 can be changed depending on the color difference signal stored in the CLUT.

When the pixel data is set to a 4-bit/pixel mode, since the MSB is used to control the changeover of CLUT 210, encoding is performed using only the lower three bits. When the pixel data is set to a 2-bit/pixel mode, encoding is performed using only the LSB because the MSB is used as described above. When encoding is conducted in the 2 bit/pixel mode in units of two pixels, it is possible that only one bit among the four bits transmitted can be used as the MSB to changeover CLUT 210 and that the remaining three bits can be used to encode the pixels.

As explained above, since the quantized fill data and key data are formed of a predetermined number of bits, the present invention realizes high speed display of high quality subtitle in a simplified circuit without causing deterioration of the display quality of the background video image.

Since the color lookup table can be changed over in the horizontal direction, the color-wipe in the KARAOKE system can also be realized. The single memory control circuit can be used to implement a simplified method for controlling the color-wipe in the KARAOKE system and the display of subtitles in foreign movies.

Particularly, according to the present invention, one loading block must be sent for each block containing about 1 kbyte of data. It is unnecessary to send additional data to perform a color-wipe or to prepare for the memory access band exceeding the conventional 4-bit/pixel or 2-bit/pixel band.

Although preferred embodiment of the present invention has been described and illustrated, it will be apparent to those skilled in the art that various modifications may be made without departing from the spirit and scope of the invention.

I claim:

1. A subtitle encoding apparatus for use in a video image transmission system having an input bit stream including subtitle data and video image data, said apparatus comprising:

a color lookup table having addresses for accessing display data;

means for creating loading blocks including changeover position information from position information representing relative positions of pixel data in a video image by sampling the input bit stream at a frame interval, said changeover position information being used to update a change position located in the video image, wherein a current address for accessing said color lookup table is changeable to a next address every frame period so that different display data are accessed at the change position indicated by said changeover position information, said changeover position information also being used to delay the update of the change position and further being used to set a length of said delay;

means for encoding the subtitle data as a function of said color lookup table to form pixel data blocks; and means for forming data blocks from said loading blocks and said pixel data blocks for transmission.

2. An apparatus according to claim 1, wherein said display data includes fill data representing a luminance level of the subtitle data and key data representing a mixing ratio between said fill data and the video image.

3. An apparatus according to claim 1, wherein said changeover position information includes progress bits for updating said change position, holding bits for delaying the update of said change position and frame count value bits for setting a length of said delay.

4. An apparatus according to claim 1, wherein said means for forming forms the data blocks by alternately arranging said loading blocks and said pixel data blocks.

5. A subtitle decoding apparatus for use in a video image display system, said apparatus comprising:

a color lookup table having addresses for accessing display data;

means for receiving data blocks including loading blocks and pixel data blocks, said pixel data blocks representing subtitle data and said loading blocks including changeover position information, said changeover position information being used to update a change position located in a video image, wherein a current address for accessing said color lookup table is changeable to a next address every frame period so that different display data are accessed at the change position indicated by said changeover position information, said changeover position information also being used to delay the update of the change position and further being used to set a length of said delay;

means for detecting said changeover position information from said loading blocks; and means for displaying subtitles and the video image on a display screen as a function of said changeover position information and said color lookup table.

6. An apparatus according to claim 5, wherein said display data includes fill data representing a luminance level of the subtitle data and key data representing a mixing ratio between said fill data and the video image.

7. An apparatus according to claim 5, wherein said changeover position information includes progress bits for updating said change position, holding bits for delaying an update of said change position and frame count value bits for setting a length of said delay.

8. A subtitle data encoding apparatus for use in a video image transmission system having an input bit stream including subtitle data, said apparatus comprising:

a color lookup table;

means for creating loading blocks, including color-wipe information from position information representing relative positions of pixel data in a video image by sampling the input bit stream at a frame interval, said color-wipe information being used to move a color-wipe forward, wherein said color-wipe is moveable forward every frame period to shade the subtitle data based on said color-wipe information, said color-wipe information also being used to delay the color-wipe and further being used to set a length of said delay;

means for encoding the subtitle data to form pixel data blocks as a function of said color lookup table; and means for forming data blocks from said loading blocks and said pixel data blocks for transmission.

9. An apparatus according to claim 8, wherein said color-wipe information includes progress bits for moving said color-wipe forward, holding bits for delaying said color-wipe and frame count value bits for setting a length of said delay.

10. A subtitle decoding apparatus for use in a video display system, said apparatus comprising:

a color lookup table;

means for receiving data blocks including loading blocks and pixel data blocks, said loading blocks include color-wipe information, said color-wipe information being used to move a color-wipe forward, wherein said color-wipe is moveable forward every frame period to shade subtitle data, said color-wipe information also being used to delay said color-wipe and further being used to set a length of said delay, and said pixel data blocks represent the subtitle data;

means for detecting said color-wipe information from said loading blocks; and means for displaying said color-wipe and the subtitle data on a display screen as a function of said color-wipe information and said color lookup table.

11. An apparatus according to claim 10, wherein said color-wipe information includes progress bits for moving said color-wipe forward, holding bits for delaying said color-wipe and frame count value bits for setting a length of said delay.

12. A subtitle encoding and decoding apparatus for use in a video image transmission and display system having an input bit stream including subtitle data and video image data, said apparatus comprising:

a color lookup table having addresses for accessing display data;

means for creating loading blocks including changeover position information from position information representing relative positions of pixel data in a video image by sampling the input bit stream at a frame interval, said changeover position information being used to update a change position located in the video image, wherein a current address for accessing said color lookup table is changeable to a next address every frame period so that different display data are accessed at the change position indicated by said changeover position information, said changeover position information also being used to delay the update of the change position and further being used to set a length of said delay;

means for encoding the subtitle data as a function of said color lookup table to form pixel data blocks;

means for forming data blocks from said loading blocks and said pixel data blocks for transmission;

means for receiving said data blocks;

means for detecting said changeover position information from the received loading blocks; and means for displaying the subtitle data and the video image on a display screen as a function of said changeover position information and said color lookup table.

13. A subtitle data encoding and decoding apparatus for use in a video image transmission and display system having an input bit stream including subtitle data, said apparatus comprising:

a color lookup table;

means for creating loading blocks including color-wipe information from position information representing relative positions of pixel data in a video image by sampling the input bit stream at a frame interval, said color-wipe information being used to move a color-wipe forward, wherein said color-wipe is moveable forward every frame period to shade the subtitle data based on said color-wipe information, said color-wipe information also being used to delay the color-wipe and further being used to set a length of said delay;

means for encoding the subtitle data to form pixel data blocks as a function of said color lookup table;

means for forming data blocks from said loading blocks and said pixel data blocks for transmission;

means for receiving said data blocks;

means for detecting said color-wipe information from the received loading blocks; and means for displaying said color-wipe and the subtitle data on a display screen as a function of said color-wipe information and said color lookup table.

14. A subtitle encoding method for use in a video image transmission system wherein an input bit stream includes subtitle data and video image data, said method comprising the steps of:

creating a loading block including changeover position information from position information representing relative positions of pixel data in a video image by sampling the input bit stream at a frame interval, said changeover position information being used to update a change position located in the video image, wherein a current address for accessing a color lookup table having addresses for accessing display data is changeable to a next address every frame period so that different display data are accessed at the change position indicated by said changeover position information, said changeover position information also being used to delay the update of the change position and further being used to set a length of said delay;

encoding the subtitle data as a function of said color lookup table to form pixel data blocks; and forming data blocks from said loading blocks and said pixel data blocks for transmission.

15. A method according to claim 14, wherein said display data includes fill data representing a luminance level of the subtitle data and key data representing a mixing ratio between said fill data and the video image.

16. A method according to claim 14, wherein said changeover position information includes progress bits for updating said change position, holding bits for delaying the update of the change position and frame count value bits for setting a length of said delay.

17. A method according to claim 14, wherein said forming step forms the data blocks by alternately arranging said loading blocks and said pixel data blocks.

18. A subtitle decoding method for use in a video image display system, said method comprising the steps of:

receiving data blocks including loading blocks and pixel data blocks, said pixel data blocks representing subtitle data and said loading blocks including changeover position information, said changeover position information being used to update a change position located in a video image, wherein a current address for accessing a color lookup table having addresses for accessing display data is changeable to a next address every frame period so that different display data are accessed at the change position indicated by said changeover position information, said changeover position information also being used to delay the update of the change position and further being used to set a length of said delay;

detecting said changeover position information from said loading blocks; and displaying said subtitle data and the video image on a display screen as a function of said changeover position information and said color lookup table.

19. A method according to claim 18, wherein said display data includes fill data representing a luminance level of the subtitle data and key data representing a mixing ratio between said fill data and the video image.

20. A method according to claim 18, wherein said changeover position information includes progress bits for updating said change position, holding bits for delaying an update of said change position and frame count value bits for setting a length of said delay.

21. A subtitle data encoding method for use in a video image transmission system wherein an input bit stream which includes subtitle data, said method comprising the steps of:

creating loading blocks, including color-wipe information from position information representing relative positions of pixel data in a video image by sampling the input bit stream at a frame interval, said color-wipe information being used to move a color-wipe forward, wherein said color-wipe is moveable forward every frame period to shade the subtitle data based on said color-wipe information, said color-wipe information also being used to delay the color-wipe and further being used to set a length of said delay;

encoding the subtitle data to form pixel data blocks as a function of a color lookup table; and forming data blocks from said loading blocks and said pixel data blocks for transmission.

22. A method according to claim 21, wherein said color-wipe information includes progress bits for moving said color-wipe forward, holding bits for delaying said color-wipe and frame count value bits for setting a length of said delay.

23. A subtitle decoding method for use in a video display system, said method comprising the steps of:

receiving data blocks including loading blocks and pixel data blocks, said loading blocks including color-wipe information, said color-wipe information being used to move a color-wipe forward, wherein said color-wipe is moveable forward every frame period to shade subtitle data, said color-wipe information also being used to delay the color-wipe and further being used to set a length of said delay, and said pixel data blocks represent the subtitle data;

detecting said color-wipe information from said loading blocks; and displaying said color-wipe and said subtitle data on a display screen as a function of said color-wipe information and a color lookup table.

24. A method according to claim 23, wherein said color-wipe information includes progress bits for moving said color-wipe forward, holding bits for delaying the color-wipe and frame count value bits for setting a length of said delay.

25. A subtitle encoding and decoding method for use in a video image transmission and display system wherein an input bit stream includes subtitle data and video image data, said method comprising the steps of:

creating loading blocks including changeover position information from position information representing relative positions of pixel data in a video image by sampling the input bit stream at a frame interval, said changeover position information being used to update a change position located in the video image, wherein a current address for accessing a color lookup table having addresses for accessing display data is changeable to a next address every frame period so that different display data are accessed at the change position indicated by said changeover position information, said changeover position information also being used to delay the update of the change position and further being used to set a length of said delay;

encoding the subtitle data as a function of said color lookup table to form pixel data blocks; and forming data blocks from said loading blocks and said pixel data blocks for transmission;

receiving said data blocks;

detecting said changeover position information from the received loading blocks; and displaying said subtitle data and the video image on a display screen as a function of said changeover position information and said color lookup table.

26. A subtitle data encoding and decoding method for use in a video image transmission and display system wherein an input bit stream includes subtitle data, said method comprising the steps of:

creating loading blocks including color-wipe information from position information representing relative positions of pixel data in a video image by sampling the input bit stream at a frame interval, said color-wipe information being used to move a color-wipe forward, wherein said color-wipe is moveable forward every frame period to shade the subtitle data based on said color-wipe information, said color-wipe information also being used to delay the color-wipe and further being used to set a length of said delay;

encoding the subtitle data to form pixel data blocks as a function of a color lookup table;

forming data blocks from said loading blocks and said pixel data blocks for transmission;

receiving said data blocks;

detecting said color-wipe information from the received loading blocks; and displaying said color-wipe and said subtitle data on a display screen as a function of said color-wipe information and said color lookup table.

27. A subtitle data recording medium, comprising a storage layer for storing data blocks, said data blocks including pixel data blocks representing subtitle data and loading blocks including changeover position information which is used to update a change position located in a video image, wherein a current address for accessing a color lookup table having an address for accessing display data is changeable to a next address every frame period so that different display data are accessed at the change position indicated by said changeover position information, said changeover position information also being used to delay the update of the change position and further being used to set a length of said delay.

28. A medium according to claim 27, wherein said changeover position information includes progress bits for updating said change position, holding bits for delaying the update of the change position and frame count value bits for setting a length of said delay.

29. A subtitle data recording medium, comprising a storage layer for storing data blocks, said data blocks including pixel data blocks representing subtitle data and loading blocks including color-wipe information which is used to move a color-wipe forward, wherein said color-wipe is moveable forward every frame period to shade subtitle data based on said color-wipe information, said color-wipe information also being used to delay the color-wipe and further being used to set a length of said delay.

30. A medium according to claim 29, wherein said color-wipe information includes progress bits for moving said color-wipe forward, holding bits for delaying said color-wipe and frame count value bits for setting a length of said delay.

* * * * *